United States Patent Office 3,808,188
Patented Apr. 30, 1974

3,808,188
CATALYSTS AND PROCESS FOR α-OLEFIN POLYMERIZATION
Fritz Lochner and Hansjorg Reuther, Cologne, Germany, assignors to Wacker Chemie G.m.b.H., Munich, Germany
No Drawing. Filed Nov. 30, 1971, Ser. No. 203,430
Claims priority, application Germany, Dec. 9, 1970, P 20 60 606.8
Int. Cl. C08f 1/44, 3/06
U.S. Cl. 260—94.9 C     5 Claims

ABSTRACT OF THE DISCLOSURE

Catalysts for the polymerization of α-olefins based on the reaction product of halides and/or alkoxides of metals of the sub-groups IV to VI of the Mendeleev Periodic System with silicon compounds containing hydrogen bound to silicon and, optionally with aluminum halides and/or alkoxides and/or alkyls characterized in that the catalyst is prepared in the presence of from 1 to 500 gm. of hexamethyl- or hexaethyl-benzene per kilogram of the other catalyst raw materials, as well as the process of preparing the catalysts and the process of polymerization of α-olefins having from 2 to 6 carbon atoms with the said catalyst.

THE PRIOR ART

It is known to polymerize α-olefins in the presence of catalysts, which catalysts are prepared from compounds of the elements of the sub-groups IV to VI of the Mendeleev Periodic System, and from silicon compounds containing hydrogen bound to silicon, as well as, optionally, aluminum compounds. For example, such processes were specified in German Pats. 1,191,105 and 1,214,407. According to these processes, the polyolefins are obtained in the form of relatively fine-grained powders. These fine-grained powders so prepared possess a bad trickling capacity and thus transport problems occur. The sides, the bad trickling capacity causes a poor inflow into the processing machines. In addition, such polyolefin powders have a non-permissible dust content.

On the other hand, the processing of powders, has the advantage over the use of granulates, in that no granulating devices are necessary, and no thermal damage of the products by a granulation procedure occurs. For this reason, there exists a great technical interest to find polymerization processes that will lead to coarse-grained powders, in order to make possible the direct processing of the formed powder.

Another disadvantage of the known catalyst systems with silicon compounds containing hydrogen bound to silicon is, that relatively large amounts of catalysts are required per kilogram of finished product.

OBJECTS OF THE INVENTION

An object of the present invention is the development of a process for polymerization of α-olefins leading to a coarse-grained polymerizate powder.

Another object of the present invention is the development of a catalyst for the polymerization of α-olefins consisting essentially of the reaction product of (1) one part by volume of a silicon compound containing hydrogen bonded to silicon, (2) from 0.9 to 1.5 parts by volume of a compound selected from the group consisting of halides and lower-alkoxides of metals of the sub-groups IV to VI of the Mendeleev Periodic System, (3) from 0 to 0.1 parts by volume of an aluminum compound selected from the group consisting of aluminum halides, aluminum lower alkoxides and lower alkyl aluminums, and (4) from 1 to 500 gms. per kilogram of components (1), (2) and (3), of a compound selected from the group consisting of hexamethylbenzene and hexaethylbenzene, said components being agitated together at a temperature of from 20° C. to 80° C. in an inert anhydrous atmosphere until evolution of hydrogen ceases.

A further object of the present invention is the development of a process for the preparation of coarse-grained polyolefin polymerizates which consists essentially in polymerizing an α-olefin having from 2 to 6 carbon atoms in the presence of a saturated hydrocarbon having 5 to 9 carbon atoms at temperatures of from 40° C. to 100° C. and pressures of from 0 to 25 atmospheres excess pressure in the presence of a polymerization catalyst consisting essentially of the reaction product of (1) one part by volume of a silicon compound containing hydrogen bonded to silicon, (2) from 0.9 to 1.5 parts by volume of a compound selected from the group consisting of halides and lower-alkoxides of metals of the sub-groups IV to VI of the Mendeleev Periodic System, (3) from 0 to 0.1 part by volume of an aluminum compound selected from the group consisting of aluminum halides, aluminum lower alkoxides and lower alkyl aluminums, and (4) from 1 to 500 gms. per kilogram of components (1), (2) and (3), of a compound selected from the group consisting of hexamethylbenzene and hexaethylbenzene, said components being agitated together at a temperature of from 20° C. to 80° C. in an inert anhydrous atmosphere unit evolution of hydrogen ceases, and recovering said coarse-grained polyolefin polymerizates.

These and other objects of the invention will become more apparent as the description thereof proceeds.

DESCRIPTION OF THE INVENTION

The above objects have been achieved by the present process for preparation of a catalyst and its use in the polymerization of α-olefins. The invention involves a process for the polymerization or mixed polymerization of α-olefins having from 2 to 6 carbon atoms, preferably ethylene, at a temperature of from 40° C. to 100° C. and a pressure of from 0 to 25, preferably 5 to 15 atmospheres excess pressure in the presence of a catalyst that has been prepared from metal halides and/or alkoxides of the elements of the sub-groups IV to VI of the Mendeleev Periodic System, and from silicon compounds containing hydrogen atoms bound to silicon, as well as, optionally, from aluminum halides and/or alkoxides and/or alkyls. This process is characterized in that the preparation of the catalyst is carried out in the presence of from 1 to 500 gm., preferably 5 to 50 gm. of hexaethylbenzene or hexamethylbenzene per kilogram of the other catalyst raw materials.

It was found surprisingly, that the addition of hexamethylbenzene or hexaethylbenzene in the preparation of the catalyst, gives a catalyst that permits the production of polyolefin powders whose average grain size is above $200\mu$. The powders produced thereby possess a good free-flowing quality and are very well suited for powder processing.

It was further found that with the catalyst, according to the invention, the yield of polymer powder could be increased up to the two-fold, per gram of catalyst utilized.

The catalyst, according to the invention, is preferably a catalyst for the polymerization of α-olefins consisting essentially of the reaction product of (1) one part by volume of a silicon compound containing hydrogen bonded to silicon, (2) from 0.9 to 1.5 parts by volume of a compound selected from the group consisting of halides and lower-alkoxides of metals of the sub-groups IV to VI of the Mendeleev Periodic System, (3) from 0 to 0.1 part by volume of an aluminum compound selected from the group consisting of aluminum halides, aluminum lower alkoxides and lower alkyl aluminums, and (4) from 1 to 500 gms. per kilogram of components (1), (2) and (3), of a compound selected from the group consisting of hexamethylbenzene and hexaethylbenzene, said components being agitated together at a temperature of from 20° C. to 80° C. in an inert anhydrous atmosphere until evolution of hydrogen ceases.

The preparation of the catalyst is carried out by mixing of the metal halides and/or alkoxides, and the silicon compounds, containing hydrogen atoms bound to silicon, as well as the optional aluminum halides and/or alkoxides and/or alkyls with the hexaethylbenzene or hexamethylbenzene, whereby under agitation, for instance with a vibromixer, and often in the presence of an inert auxiliary liquid, the operation takes place. Substantially suitable as auxiliary liquids are saturated hydrocarbons having 5 to 9 carbon atoms, such as, n-pentane, n-hexane, cyclohexane, n-heptane and isooctane. Usually, that auxiliary liquid is selected that is also used for the polymerization.

The mixture of the catalyst raw materials is maintained for several hours with agitation, at a temperature from 20° C. to 80° C., whereby, with evolution of hydrogen, the catalytically effective suspension is formed. The preparation is executed with the exclusion of moisture and air, in the presence of an inert atmosphere (nitrogen or hydrogen).

As halides of the sub-groups IV to VI of the Periodic System, preferably titanium tetrachloride, vanadium chloride and vanadium oxychloride are used. As silicon compounds, containing hydrogen atoms bound to silicon, silanes, monomeric or polymeric hydrogen siloxanes, particularly methyl or phenyl hydrogen polysiloxanes are suitable. Aluminum chloride and/or lower alkyl aluminum are used preferably as the addition components. An exact description of the compounds that may be used for the catalyst preparation, is given in the German Pats. 1,191,105 and 1,214,407.

The invention also resides in the process for the preparation of coarse-grained polyolefin polymerizates which consists essentially in polymerizing an α-olefin having from 2 to 6 carbon atoms in the presence of a saturated hydrocarbon having 5 to 9 carbon atoms at temperatures of from 40° C. to 100° C. and pressures of from 0 to 25 atmospheres excess pressure in the presence of a polymerization catalyst consisting essentially of the reaction product of (1) one part by volume of a silicon compound containing hydrogen bonded to silicon, (2) from 0.9 to 1.5 parts by volume of a compound selected from the group consisting of halides and lower-alkoxides of metals of the sub-groups IV to VI of the Mendeleev Periodic System, (3) from 0 to 0.1 part by volume of an aluminum compound selected from the group consisting of aluminum halides, aluminum lower alkoxides and lower alkyl aluminums, and (4) from 1 to 500 gms. per kilogram of components (1), (2) and (3), of a compound selected from the group consisting of hexamethylbenzene and hexaethylbenzene, said components being agitated together at a temperature of from 20° C. to 80° C. in an inert anhydrous atmosphere until evolution of hydrogen ceases, and recovering said coarse-gained polyolefin polymerizates.

As α-olefins with 2 to 6 carbon atoms, preferably ethylene and mixtures of ethylene with up to 10 mol percent of propylene, butene-1, 4-methylpentene-1 are considered. Also propylene and α-olefins with a higher number of carbon atoms can be advantageously polymerized by the process of the invention.

The polymerization process can be carried out both in the gas phase and particularly in inert liquids, whereby saturated hydrocarbons having 5 to 9 carbon atoms are particularly suitable such as, n-pentane, n-hexane, cyclohexane, n-heptane and isooctane.

The operation mostly takes place in autoclaves with agitators, dosing and withdrawal devices and the polymerization may be carried out continuously or also discontinuously. The polymer suspensions, often obtained by this process, are treated in a known manner (such as described in commonly-assigned U.S. patent application Ser. No. 152,761, filed June 14, 1971, and now U.S. Pat. No. 3,775,389) with alcohol for the decomposition and solution of the catalyst, then the polyolefin is separated from the liquid phase and dried.

The following examples are illustrative of the practice of the invention without being deemed limitative in any respect.

EXAMPLE 1

Preparation of the catalyst 5 ml. of a linear methylhydrogen polysiloxane, that has a viscosity of 32 cst./25° C., and is end-blocked by trimethyl siloxy groups, were mixed with 6.5 ml. of titanium tetrachloride, 5 ml. of isooctane and 3.25 gm. of hexaethylbenzene. The mixture was allowed to react under nitrogen and the influence of a vibro mixer for 3 hours at a temperature of 75° C., whereby with hydrogen evolution, the dark-brown catalyst suspension was formed.

Polymerization 1.2 liter of isooctane were charged into a 2-liter glass flask, equipped with agitator, glass-inlet tube, thermometer and reflux condenser. The flash was purged with nitrogen, heated to a reaction temperature of 75° C. and 3.5 ml. of the above catalyst suspension added with a pipette. Subsequently, during 2 hours at the same temperature, ethylene was lead into the liquid at a speed that a weak stream of waste gas leaves through the reflux condenser. From the reaction medium, powdery polyethylene separated. By the addition of about 100 ml. of methanol and an exposure to air, the catalyst was decomposed and brought into solution. After the vacuum suctioning and drying of the formed polymerizate, 45 gm. of a powdery polyethylene were obtained with an average grain size of 200μ, having a melt index [MFI (melt flow index) 190° C./5 kp.] of 4.5 gm./10 min.

Comparison experiment

The polymerization was repeated, however, the catalyst was prepared without addition of hexaethylbenzene. Under otherwise identical conditions, 32 gm. of polyethylene powder were obtained with an average grain size of 120μ, having a melt index of 4.2 gm./10 min.

EXAMPLE 2

Preparation of the catalyst

In a glass vessel, equipped with a vibro-mixer and thermometer, under ntirogen, 300 ml. of n-heptane, 300 ml. of methylhydrogen polysiloxane, as in Example 1, 400 ml. of titanium tetrachloride, 15 gm. of anhydrous aluminum chloride and 40 gm. of hexaethylbenzene were reacted at an internal temperature of 40° C. for 5 hours with intensive mixing. After a quick cooling to room temperature, the reaction mixture was diluted with additional 600 ml. of n-heptane. The catalyst mixture thus otbained is quantitatively calculated as 1 kg.

Polymerization

Into an autoclave, equipped with a cooling jacket and agitator, of a capacity of about 100 liters, at a pressure of 10 atmospheres excess pressure, and an internal temperature of 70° C. per hour, 2.9 gm. of the above-described catalyst, 7.3 liters of n-heptane and 4 kg. of ethylene were dosed in. In an exothermic reaction, polyethylene was formed as a suspension in n-heptane. In order to avoid a concentration of inert gas in the gas space of the reaction vessel, per hour, about 9% of the gas added were removed as waste gas. Through a dip pipe the polyethylene suspension was continuously withdrawn, and thus the reaction volume in the autoclave kept constant. The suspension withdrawn from the reaction vessel was treated in a successively connected stirring vessel with 0.5 liter of isopropyl alcohol per hour, for the decomposition and solution of the catalyst, contained in the suspension. Subsequently, the powdery polyethylene was separated with the aid of a centrifuge from the liquid reaction medium, after-washed with isopropyl alcohol and the alcohol-moist product dried.

As an average, 3.65 kg. of polyethylene per hour were obtained with a melt index (MFI 190° C./5 kp.) of about 1.1 gm./10 min. and an average grain size of 220µ.

Comparison experiment

The catalyst was prepared without hexaethylbenzene, and the polymerization was executed, as described above. As an average 2.4 kg. of polyethylene per hour were obtained with a melt index of 0.9 gm./10 min. and an average grain size of 100µ.

EXAMPLE 3

Preparation of the catalyst

In a glass vessel, equipped with a vibro-mixer and maintained at 50° C. by thermostat, under exclusion of moisture and oxygen in air, 50 ml. of n-heptane, 25 ml. of methylhydrogen polysiloxane, as in Examples 1 and 2, 32.5 ml. of titanium tetrachloride, 1.25 gm. of anhydrous aluminum chloride and 1.65 gm. of hexamethylbenzene were reacted during 3 hours with intensive mixing. Subsequently, the formed catalyst suspension was cooled to room temperature and diluted with 200 ml. of n-heptane.

Polymerization

In a laboratory stirring autoclave, equipped with a cooling jacket, thermometer and gas-inlet tube, of about 1-liter capacity, under inert conditions, 60 ml. of n-heptane and 3.65 ml. of the catalyst suspension were charged. Subsequently at a constant internal temperature of 75° C. and an ethylene pressure of 10 atmospheres excess pressure, the polymerization was executed during 2 hours. It was terminated by the addition of 50 gm. of methanol and the mixture processed by vacuum suctioning and drying. In this manner, 261 gm. of a polyethylene powder with an average grain size of 205µ and a melt index (MFI 190° C./5 kg.) of 0.95 gm./10 min. were obtained.

Comparison experiment

The above-described laboratory polymerization was repeated with a catalyst, that was prepared in the same manner, but without addition of hexamethylbenzene. In this manner only 168 gm. of a polyethylene powder were obtained with an average grain size of 105µ and a melt index (MFI 190° C./kp.) of 5.6 gm./10 min.

The preceding specific embodiments are illustrative of the practice of the invention. It is to be understood, however, that other expedients known to those skilled in the art or disclosed herein, may be employed without departing from the spirit of the invention or the scope of the appended claims.

We claim:
1. A catalyst for the polymerization of α-olefins consisting essentially of the reaction product of (1) one part by volume of methylhydrogen polysiloxane, (2) from 0.9 to 1.5 parts by volume of titanium tetrachloride (3) from 0 to 0.1 part by volume of aluminum chloride, and (4) from 1 to 500 gms. per kilogram of components (1), (2) and (3), of a compound selected from the group consisting of hexamethylbenzene and hexaethylbenzene, said components being agitated together at a temperature of from 20° C. to 80° C. in an inert anhydrous atmosphere until evolution of hydrogen ceases.

2. The catalyst of claim 1, wherein said hexamethylbenzene or hexaethylbenzene is utilized in an amount of from 5 to 50 gm. per kilogram of the other catalyst raw materials.

3. A process for the preparation of coarse-grained polyolefin polymerizates which consists essentially in polymerizing an α-olefin having from 2 to 6 carbon atoms in the presence of a saturated hydrocarbon having 5 to 9 carbon atoms at temperatures of from 40° C. to 100° C. and pressures of from 0 to 25 atmospheres excess pressure in the presence of a polymerization catalyst consisting essentially of the reaction product of (1) one part by volume of methylhydrogen polysiloxane, (2) from 0.9 to 1.5 parts by volume of titanium tetrachloride, (3) from 0 to 0.1 part by volume of aluminum chloride and (4) from 1 to 500 gms. per kilograms of components (1), (2) and (3), of a compound selected from the group consisting of hexamethylbenzene and hexaethylbenzene, said components being agitated together at a temperature of from 20° C. to 80° C. in an inert anhydrous atmosphere until evolution of hydrogen ceases, and recovering said coarse-grained polyolefin polymerizates.

4. The process of claim 3 wherein said hexamethylbenzene or hexaethylbenzene is utilized in an amount of from 5 to 50 gm. per kilogram of the other catalyst raw materials.

5. A process for the preparation of coarse-grained polyethylene polymerizates which consists essentially in polymerizing ethylene in the presence of a saturated hydrocarbon having 5 to 9 carbon atoms at temperatures of from 40° C. to 100° C. and pressures of from 0 to 25 atmospheres excess pressure in the presence of a polymerization catalyst consisting essentially of the reaction product of (1) one part by volume of methylhydrogen polysiloxane, (2) from 0.9 to 1.5 parts by volume of titanium tetrachloride, (3) from 0 to 0.1 part by volume of aluminum chloride, and (4) from 1 to 500 gms. per kilogram of components (1), (2) and (3), of a compound selected from the group consisting of hexamethylbenzene and hexaethylbenzene, said components being agitated together at a temperature of from 20° C. to 80° C. in an inert anhydrous atmosphere until evolution of hydrogen ceases, and recovering said coarse-grained polyethylene polymerizates.

References Cited

UNITED STATES PATENTS

| | | | |
|---|---|---|---|
| 2,938,000 | 5/1960 | Wanless et al. | 260—94.9 DA |
| 3,676,418 | 7/1972 | Tashiro et al. | 260—94.9 E |
| 3,661,878 | 5/1972 | Aishima et al. | 260—94.9 E |
| 2,974,133 | 3/1961 | Wiberg et al. | 260—94.9 C |
| 3,227,702 | 1/1966 | Small et al. | 260—94.9 B |
| 3,048,574 | 8/1962 | Wiberg et al. | 260—94.9 B |
| 3,328,378 | 6/1967 | Piekarski et al. | 260—94.9 E |

FOREIGN PATENTS

| | | | |
|---|---|---|---|
| 1,016,512 | 1/1966 | Great Britain | 260—94.9 C |

OTHER REFERENCES

Boor: Jour. Poly. Sci., vol. 3, Pt. A (1965), pp. 995–1012.

JAMES A. SEIDLECK, Primary Examiner

E. J. SMITH, Assistant Examiner

U.S. Cl. X.R.

252—429 B, 429 C; 260—93.7